United States Patent
Li et al.

(10) Patent No.: US 11,129,193 B2
(45) Date of Patent: Sep. 21, 2021

(54) DATA TRANSMISSION METHOD AND APPARATUS USING A CLEAR CHANNEL ASSESSMENT (CCA) DETECTION THRESHOLD

(71) Applicant: Huawei Technologies Co., Ltd., Shenzhen (CN)

(72) Inventors: Zhenyu Li, Beijing (CN); Hantao Li, Beijing (CN); Chuan Liu, Beijing (CN); Lei Hu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/415,881

(22) Filed: May 17, 2019

(65) Prior Publication Data

US 2019/0274167 A1    Sep. 5, 2019

Related U.S. Application Data

(63) Continuation of application No. PCT/CN2016/106376, filed on Nov. 18, 2016.

(51) Int. Cl.
*H04W 74/08*    (2009.01)
*H04B 17/318*    (2015.01)
(Continued)

(52) U.S. Cl.
CPC ...... *H04W 74/0816* (2013.01); *H04B 17/318* (2015.01); *H04L 1/0003* (2013.01);
(Continued)

(58) Field of Classification Search
CPC . H04W 52/143; H04W 52/18; H04W 52/241; H04W 52/367; H04W 52/243;
(Continued)

(56) References Cited

U.S. PATENT DOCUMENTS

| | | | |
|---|---|---|---|
| 2013/0336269 A1* | 12/2013 | Davydov | H04W 24/02 370/329 |
| 2015/0124665 A1* | 5/2015 | Park | H04J 4/00 370/280 |

(Continued)

FOREIGN PATENT DOCUMENTS

| | | |
|---|---|---|
| CN | 103580784 A | 2/2014 |
| CN | 104717038 A | 6/2015 |

(Continued)

OTHER PUBLICATIONS

"Part 11: Wireless LAN Medium Access Control (MAC) and Physical Layer (PHY) Specifications," IEEE Standards Association, Std 802. Nov. 2012, pp. 1-2688, Institute of Electrical and Electronics Engineers—New York, New York (Mar. 29, 2012).

(Continued)

*Primary Examiner* — Ian N Moore
*Assistant Examiner* — Sun Jong Kim
(74) *Attorney, Agent, or Firm* — Leydig, Voit & Mayer, Ltd.

(57) ABSTRACT

A data transmission method and apparatus using a clear channel assessment (CCA) detection threshold are disclosed. The method includes: obtaining, by a base station, at least one CCA detection threshold; determining a current CCA detection threshold from the at least one CCA detection threshold; determining transmit power of to-be-sent data based on the current CCA detection threshold; and sending the to-be-sent data to a target terminal based on the transmit power.

2 Claims, 3 Drawing Sheets

(51) Int. Cl.

| | | |
|---|---|---|
| *H04L 1/00* | (2006.01) | |
| *H04W 52/24* | (2009.01) | |
| *H04W 72/08* | (2009.01) | |
| *H04W 72/12* | (2009.01) | |
| *H04L 5/00* | (2006.01) | |
| *H04W 52/02* | (2009.01) | |
| *H04W 52/04* | (2009.01) | |

(52) U.S. Cl.
CPC ............ *H04L 5/006* (2013.01); *H04L 5/0062* (2013.01); *H04L 5/0064* (2013.01); *H04W 52/0216* (2013.01); *H04W 52/04* (2013.01); *H04W 52/243* (2013.01); *H04W 72/082* (2013.01); *H04W 72/1226* (2013.01); *H04L 5/0042* (2013.01)

(58) Field of Classification Search
CPC . H04W 52/24; H04W 72/1226; H04W 52/50; H04W 72/1289; H04W 74/0816; H04W 74/0808; H04W 52/262
See application file for complete search history.

(56) References Cited

U.S. PATENT DOCUMENTS

| | | | |
|---|---|---|---|
| 2015/0163824 A1 | 6/2015 | Krzymien et al. | |
| 2015/0296370 A1* | 10/2015 | Kim | H04W 24/08 370/338 |
| 2015/0373652 A1 | 12/2015 | Dabeer et al. | |
| 2016/0014796 A1 | 1/2016 | Soder et al. | |
| 2016/0227489 A1 | 8/2016 | Oteri et al. | |
| 2017/0019161 A1* | 1/2017 | Wang | H04B 7/0617 |
| 2018/0020396 A1* | 1/2018 | Yoshimura | H04W 84/12 |
| 2018/0049221 A1* | 2/2018 | Park | H04W 74/0808 |
| 2018/0176890 A1 | 6/2018 | Moon et al. | |
| 2018/0192442 A1* | 7/2018 | Li | H04L 5/0048 |
| 2018/0376281 A1* | 12/2018 | Guo | H04W 64/003 |

FOREIGN PATENT DOCUMENTS

| | | |
|---|---|---|
| CN | 105557055 A | 5/2016 |
| CN | 106060835 A | 10/2016 |
| CN | 106063193 A | 10/2016 |
| EP | 2978267 A1 | 1/2016 |
| EP | 3182792 A1 | 6/2017 |
| JP | 2016507178 A | 3/2016 |
| WO | 2014179713 A1 | 11/2014 |
| WO | 2015200133 A1 | 12/2015 |
| WO | 2016029342 A1 | 3/2016 |
| WO | 2016068772 A1 | 5/2016 |
| WO | 2016072815 A1 | 5/2016 |
| WO | 2016156768 A1 | 10/2016 |
| WO | 2016178550 A1 | 11/2016 |

OTHER PUBLICATIONS

"WF on CCA threshold and power allocation for LAA," 3GPP TSG RAN WG1 Ad-hoc Meeting, Paris, France, R1-151180, pp. 1-32, 3rd Generation Partnership Project, Valbonne, France (Mar. 24-26, 2015).

* cited by examiner

DATA TRANSMISSION METHOD AND APPARATUS USING A CLEAR CHANNEL ASSESSMENT (CCA) DETECTION THRESHOLD

CROSS-REFERENCE TO RELATED APPLICATIONS

This application is a continuation of International Application No. PCT/CN2016/106376, filed on Nov. 18, 2016, the disclosure of which is hereby incorporated by reference in its entirety.

TECHNICAL FIELD

Embodiments of the present disclosure relate to mobile communications technologies, and in particular, to a data transmission method and apparatus.

BACKGROUND

Spectrums are rare and non-renewable resources in mobile communications, and a requirement for the spectrums is growing exponentially. It can be predicted that, when usage efficiency of licensed spectrums reaches an upper limit, spectrum shortage becomes a bottleneck that restricts mobile communications development. Compared with licensed spectrums, unlicensed spectrums still have considerably available resources. Therefore, how to effectively use the unlicensed spectrums becomes a focus of attention from numerous operators and device vendors.

Because an unlicensed spectrum can be used without authorization by a government, and a plurality of wireless access technologies including a Wireless Fidelity (Wi-Fi) technology and a licensed-assisted access (LAA) technology may exist at the same time, problems such as improper channel resource allocation and co-channel interference are caused.

To better resolve the problem that a plurality of wireless access technologies coexist, a Listen Before Talk (LBT) mechanism is introduced into both the LAA technology and the Wi-Fi technology. A clear channel assessment (CCA) detection threshold is an important parameter in the LBT mechanism, and is a basis used by a station to determine whether a channel is busy or idle. When signal energy detected by the station is higher than the CCA detection threshold, the station determines that the channel is currently in a busy state, that is, the channel is unavailable. When signal energy detected by the station is lower than the CCA detection threshold, the station determines that the channel is currently in an idle state, that is, the channel is available. To better ensure fairness between systems, CCA detection duration is a random value.

However, in the prior art, during data transmission of one station, another station detects that the channel is unavailable, and cannot perform data transmission. For example, a station 1 and a station 2 perform CCA detection. The station 1 first detects that the channel is available, and then the station 1 starts to send data. In a data transmission phase of the station 1, the station 2 detects that the channel is not available until the station 1 finishes the data transmission. The station 2 can perform data transmission only when the station 2 completes CCA detection before the station 1. Consequently, the data transmission of the station 2 is delayed, usage efficiency of an unlicensed spectrum is low, and a network throughput is affected.

SUMMARY

Embodiments of the present disclosure provide a data transmission method and apparatus, to reduce a data transmission delay and improve usage efficiency of an unlicensed spectrum and a network throughput while ensuring that interference between systems is not increased.

A first aspect of the embodiments of the present disclosure provides a data transmission method, including:
obtaining, by a base station, at least one CCA detection threshold, where each CCA detection threshold corresponds to at least one to-be-scheduled terminal;
determining, by the base station, a current CCA detection threshold from the at least one CCA detection threshold;
determining, by the base station, transmit power of to-be-sent data based on the current CCA detection threshold; and
sending, by the base station, the to-be-sent data to a target terminal based on the transmit power, where the target terminal belongs to the at least one to-be-scheduled terminal.

Optionally, the determining, by the base station, a current CCA detection threshold from the at least one CCA detection threshold includes:
performing, by the base station, CCA detection based on historical statistics or throughput prediction or both by using a first CCA detection threshold, and determining the first CCA detection threshold as the current CCA detection threshold after the CCA detection succeeds, where the first CCA detection threshold is a CCA detection threshold corresponding to a first terminal, and the first terminal is one of the at least one to-be-scheduled terminal; or
performing, by the base station, CCA detection by using a first CCA detection threshold, and determining the first CCA detection threshold as the current CCA detection threshold after the CCA detection succeeds, where the first CCA detection threshold is a CCA detection threshold corresponding to a first terminal, and the first terminal is a terminal whose priority is the highest in the at least one to-be-scheduled terminal; or
performing, by the base station, CCA detection by using a first CCA detection threshold, and determining the first CCA detection threshold as the current CCA detection threshold after the CCA detection succeeds, where the first CCA detection threshold is a CCA detection threshold corresponding to a first terminal, the first terminal belongs to a first terminal group, and the CCA detection threshold corresponding to the first terminal is within a CCA detection threshold range of the first terminal group.

Optionally, the determining, by the base station, a current CCA detection threshold from the at least one CCA detection threshold includes:
determining, by the base station, a plurality of pending CCA detection thresholds from the at least one CCA detection threshold based on a priority of the at least one to-be-scheduled terminal, to perform CCA detection; and if the base station succeeds in performing detection by using a pending CCA detection threshold whose threshold is smallest in the plurality of pending CCA detection thresholds, determining, by the base station, the pending CCA detection threshold whose threshold is smallest as the current CCA detection threshold; or if the base station fails to perform detection by using a pending CCA detection threshold whose threshold is smallest, and the base station determines to wait for an N value corresponding to the pending CCA detection threshold whose threshold is smallest to decrease to zero, determining, by the base station, the pending CCA detection threshold whose threshold is smallest as the current CCA detection threshold; or if the base station fails to perform detection by using a pending CCA detection threshold whose threshold is smallest, determining, by the base station, from the other pending CCA detection thresholds, a pending CCA detection threshold with successful CCA detection as the current CCA detection threshold.

Optionally, the obtaining, by a base station, at least one CCA detection threshold includes:

obtaining, by the base station, the at least one clear channel assessment CCA detection threshold based on a modulation and coding scheme MCS of the at least one to-be-scheduled terminal.

Optionally, the obtaining, by the base station, the at least one clear channel assessment CCA detection threshold based on an MCS of the at least one to-be-scheduled terminal includes:

obtaining, by the base station, the first CCA detection threshold based on a preset first adjustment step, the MCS of the at least one to-be-scheduled terminal, a maximum MCS value in a system, and a CCA detection threshold corresponding to the system; and obtaining, by the base station, the at least one CCA detection threshold based on the first CCA detection threshold, and a minimum CCA detection threshold and a maximum CCA detection threshold that are allowed by the system; where an MCS of each to-be-scheduled terminal in the at least one to-be-scheduled terminal is an MCS value of the to-be-scheduled terminal after adjustment by the base station by using a channel quality indicator CQI, or an average MCS value used for scheduling the to-be-scheduled terminal on an air interface in a preset statistical time period.

Optionally, the first CCA detection threshold $CCATn1=-82+STEP1*MCSn/MCSmax$, where STEP1 represents the preset first adjustment step, MCSn represents the MCS value after adjustment by the base station by using the CQI, and MCSmax represents the maximum MCS value in the system; or the first CCA detection threshold $CCATn1=-82+STEP1*MCSmean/MCSmax$, where MCSmean indicates the average MCS value used for scheduling the terminal on the air interface in the preset statistical time period.

Optionally, the obtaining, by a base station, at least one clear channel assessment CCA detection threshold includes:

receiving, by the base station, a received signal strength indicator RSSI reported by the at least one to-be-scheduled terminal; and determining, by the base station, a CCA detection threshold of each to-be-scheduled terminal based on the RSSI.

Optionally, the determining, by the base station, a CCA detection threshold of each to-be-scheduled terminal based on the RSSI includes:

calculating, by the base station, a difference between the RSSI and a base station side control value, to obtain a second CCA detection threshold; and determining, by the base station based on the second CCA detection threshold, and a minimum CCA detection threshold and a maximum CCA detection threshold that are allowed by a system, a CCA detection threshold of a to-be-scheduled terminal that reports the RSSI.

Optionally, the second CCA detection threshold $CCATn2=RSSI-Margin$, where Margin represents the base station side control value.

Optionally, the obtaining, by a base station, at least one clear channel assessment CCA detection threshold includes:

receiving, by the base station, signal quality indicator CQI information reported by the at least one to-be-scheduled terminal; and determining, by the base station based on the CQI information, a CCA detection threshold of a to-be-scheduled terminal that reports the CQI information.

Optionally, the determining, by the base station based on the CQI information, a CCA detection threshold of a to-be-scheduled terminal that reports the CQI information includes:

obtaining, by the base station, a third CCA detection threshold based on a preset second adjustment step, the CQI information, a maximum CQI value in a system, and a CCA detection threshold corresponding to the system; and determining, by the base station based on the third CCA detection threshold, and a minimum CCA detection threshold and a maximum CCA detection threshold that are allowed by the system, the CCA detection threshold of the to-be-scheduled terminal that reports the CQI information.

Optionally, the third CCA detection threshold $CCATn3=-82+STEP2*CQI/CQImax$.

Optionally, before the obtaining, by a base station, at least one clear channel assessment CCA detection threshold, the method further includes:

receiving, by the base station, a CCA detection threshold or a CCA detection threshold level sent by the at least one to-be-scheduled terminal, where the CCA detection threshold is determined by the to-be-scheduled terminal based on a fourth CCA detection threshold, and a minimum CCA detection threshold and a maximum CCA detection threshold that are allowed by a system, and the fourth CCA detection threshold is calculated by the to-be-scheduled terminal based on a signal to interference plus noise ratio, a minimum signal to interference plus noise ratio corresponding to the to-be-scheduled terminal, and a base station side control value; or the fourth CCA detection threshold is calculated by the to-be-scheduled terminal based on a signal strength indicator value that is obtained through reference signal measurement, a noise power value, a minimum signal to interference plus noise ratio corresponding to the to-be-scheduled terminal, and a base station side control value.

A second aspect of the embodiments of the present disclosure provides a data transmission apparatus, including:

an obtaining module, configured to obtain at least one clear channel assessment CCA detection threshold, where each CCA detection threshold corresponds to at least one to-be-scheduled terminal;

a determining module, configured to: determine a current CCA detection threshold from the at least one CCA detection threshold; and determine transmit power of to-be-sent data based on the current CCA detection threshold; and a sending module, configured to send the to-be-sent data to a target terminal based on the transmit power, where the target terminal belongs to the at least one to-be-scheduled terminal.

Optionally, the determining module is specifically configured to: perform CCA detection based on historical statistics or throughput prediction or both by using a first CCA detection threshold, and determine the first CCA detection threshold as the current CCA detection threshold after the CCA detection succeeds, where the first CCA detection threshold is a CCA detection threshold corresponding to a first terminal, and the first terminal is one of the at least one to-be-scheduled terminal; or perform CCA detection by using a first CCA detection threshold, and determine the first CCA detection threshold as the current CCA detection threshold after the CCA detection succeeds, where the first CCA detection threshold is a CCA detection threshold corresponding to a first terminal, and the first terminal is a terminal whose priority is the highest in the at least one to-be-scheduled terminal; or perform CCA detection by using a first CCA detection threshold, and determine the first CCA detection threshold as the current CCA detection threshold after the CCA detection succeeds, where the first CCA detection threshold is a CCA detection threshold corresponding to a first terminal, the first terminal belongs to a first terminal group, and the CCA detection threshold corresponding to the first terminal is within a CCA detection threshold range of the first terminal group.

Optionally, the determining module is specifically configured to: determine a plurality of pending CCA detection thresholds based on a priority of the at least one to-be-scheduled terminal, to perform CCA detection; and if detection performed by using a pending CCA detection threshold whose threshold is smallest in the plurality of pending CCA detection thresholds succeeds, determine the pending CCA detection threshold whose threshold is smallest as the current CCA detection threshold; or if detection performed by using a pending CCA detection threshold whose threshold is smallest fails, and it is determined to wait for an N value corresponding to the pending CCA detection threshold whose threshold is smallest to decrease to zero, determine the pending CCA detection threshold whose threshold is smallest as the current CCA detection threshold; or if detection performed by using a pending CCA detection threshold whose threshold is smallest fails, determine, from the other pending CCA detection thresholds, a pending CCA detection threshold with successful CCA detection as the current CCA detection threshold.

Optionally, the obtaining module is specifically configured to obtain the at least one clear channel assessment CCA detection threshold based on a modulation and coding scheme MCS of the at least one to-be-scheduled terminal.

Optionally, the obtaining module is specifically configured to: obtain the first CCA detection threshold based on a preset first adjustment step, the MCS of the at least one to-be-scheduled terminal, a maximum MCS value in a system, and a CCA detection threshold corresponding to the system; and obtain the at least one CCA detection threshold based on the first CCA detection threshold, and a minimum CCA detection threshold and a maximum CCA detection threshold that are allowed by the system; where an MCS of each to-be-scheduled terminal in the at least one to-be-scheduled terminal is an MCS value of the to-be-scheduled terminal after adjustment by the base station by using a channel quality indicator CQI, or an average MCS value used for scheduling the to-be-scheduled terminal on an air interface in a preset statistical time period.

Optionally, the obtaining module is specifically configured to: receive a received signal strength indicator RSSI reported by the at least one to-be-scheduled terminal, and determine a CCA detection threshold of each to-be-scheduled terminal based on the RSSI.

Optionally, the obtaining module is specifically configured to: calculate a difference between the RSSI and a base station side control value, to obtain a second CCA detection threshold; and determine, based on the second CCA detection threshold, and a minimum CCA detection threshold and a maximum CCA detection threshold that are allowed by a system, a CCA detection threshold of a to-be-scheduled terminal that reports the RSSI.

Optionally, the obtaining module is specifically configured to: receive channel quality indicator CQI information reported by the at least one to-be-scheduled terminal, and determine, based on the CQI information, a CCA detection threshold of a to-be-scheduled terminal that reports the CQI information.

Optionally, the obtaining module is specifically configured to: obtain a third CCA detection threshold based on a preset second adjustment step, the CQI information, a maximum CQI value in a system, and a CCA detection threshold corresponding to the system; and determine, based on the third CCA detection threshold, and a minimum CCA detection threshold and a maximum CCA detection threshold that are allowed by the system, a CCA detection threshold of a to-be-scheduled terminal that reports the CQI information.

Optionally, the obtaining module is specifically configured to receive a CCA detection threshold or a CCA detection threshold level sent by the at least one to-be-scheduled terminal, where the CCA detection threshold is determined by the to-be-scheduled terminal based on a fourth CCA detection threshold, and a minimum CCA detection threshold and a maximum CCA detection threshold that are allowed by a system, and the fourth CCA detection threshold is calculated by the to-be-scheduled terminal based on a signal to interference plus noise ratio, a minimum signal to interference plus noise ratio corresponding to the to-be-scheduled terminal, and a base station side control value; or the fourth CCA detection threshold is calculated by the to-be-scheduled terminal based on a signal strength indicator value that is obtained through reference signal measurement, a noise power value, a minimum signal to interference plus noise ratio corresponding to the to-be-scheduled terminal, and a base station side control value.

A third aspect of the embodiments of the present disclosure provides a data transmission apparatus, including a memory and a processor, where the memory is configured to store a program instruction, and the processor is configured to invoke the program instruction in the memory to perform the following method:

obtaining at least one clear channel assessment CCA detection threshold, where each CCA detection threshold corresponds to at least one to-be-scheduled terminal;

determining a current CCA detection threshold from the at least one CCA detection threshold;

determining transmit power of to-be-sent data based on the current CCA detection threshold; and sending the to-be-sent data to a target terminal based on the transmit power, where the target terminal belongs to the at least one to-be-scheduled terminal.

Optionally, the processor is specifically configured to: perform CCA detection based on historical statistics or throughput prediction or both by using a first CCA detection threshold, and determine the first CCA detection threshold as the current CCA detection threshold after the CCA detection succeeds, where the first CCA detection threshold is a CCA detection threshold corresponding to a first terminal, and the first terminal is one of the at least one to-be-scheduled terminal; or perform CCA detection by using a first CCA detection threshold, and determine the first CCA detection threshold as the current CCA detection threshold after the CCA detection succeeds, where the first CCA detection threshold is a CCA detection threshold corresponding to a first terminal, and the first terminal is a terminal whose priority is the highest in the at least one to-be-scheduled terminal; or perform CCA detection by using a first CCA detection threshold, and determine the first CCA detection threshold as the current CCA detection threshold after the CCA detection succeeds, where the first CCA detection threshold is a CCA detection threshold corresponding to a first terminal, the first terminal belongs to a first terminal group, and the CCA detection threshold corresponding to the first terminal is within a CCA detection threshold range of the first terminal group.

Optionally, the processor is specifically configured to: determine a plurality of pending CCA detection thresholds from the at least one CCA detection threshold based on a priority of the at least one to-be-scheduled terminal, to perform CCA detection; and if detection performed by using a pending CCA detection threshold whose threshold is smallest in the plurality of pending CCA detection thresholds succeeds, determine the pending CCA detection threshold whose threshold is smallest as the current CCA detection threshold; or if detection performed by using a pending CCA detection threshold whose threshold is smallest fails, and it is determined to wait for an N value corresponding to the pending CCA detection threshold whose threshold is smallest to decrease to zero, determine the pending CCA detection threshold whose threshold is smallest as the current CCA detection threshold; or if detection performed by using a pending CCA detection threshold whose threshold is smallest fails, determine, from the other pending CCA detection thresholds, a pending CCA detection threshold with successful CCA detection as the current CCA detection threshold.

Optionally, the processor is specifically configured to obtain the at least one clear channel assessment CCA detection threshold based on a modulation and coding scheme MCS of the at least one to-be-scheduled terminal.

Optionally, the processor is specifically configured to: obtain the first CCA detection threshold based on a preset first adjustment step, the MCS of the at least one to-be-scheduled terminal, a maximum MCS value in a system, and a CCA detection threshold corresponding to the system; and obtain the at least one CCA detection threshold based on the first CCA detection threshold, and a minimum CCA detection threshold and a maximum CCA detection threshold that are allowed by the system; where an MCS of each to-be-scheduled terminal in the at least one to-be-scheduled terminal is an MCS value of the to-be-scheduled terminal after adjustment by the base station by using a channel quality indicator CQI, or an average MCS value used for scheduling the to-be-scheduled terminal on an air interface in a preset statistical time period.

Optionally, the processor is specifically configured to: receive a received signal strength indicator RSSI reported by the at least one to-be-scheduled terminal, and determine a CCA detection threshold of each to-be-scheduled terminal based on the RSSI.

Optionally, the processor is specifically configured to: calculate a difference between the RSSI and a base station side control value, to obtain a second CCA detection threshold; and determine, based on the second CCA detection threshold, and a minimum CCA detection threshold and a maximum CCA detection threshold that are allowed by a system, a CCA detection threshold of a to-be-scheduled terminal that reports the RSSI.

Optionally, the processor is specifically configured to: receive channel quality indicator CQI information reported by the at least one to-be-scheduled terminal, and determine, based on the CQI information, a CCA detection threshold of a to-be-scheduled terminal that reports the CQI information.

Optionally, the processor is specifically configured to: obtain a third CCA detection threshold based on a preset second adjustment step, the CQI information, a maximum CQI value in a system, and a CCA detection threshold corresponding to the system; and determine, based on the third CCA detection threshold, and a minimum CCA detection threshold and a maximum CCA detection threshold that are allowed by the system, a CCA detection threshold of a to-be-scheduled terminal that reports the CQI information.

Optionally, the processor is specifically configured to receive a CCA detection threshold or a CCA detection threshold level sent by the at least one to-be-scheduled terminal, where the CCA detection threshold is determined by the to-be-scheduled terminal based on a fourth CCA detection threshold, and a minimum CCA detection threshold and a maximum CCA detection threshold that are allowed by a system, and the fourth CCA detection threshold is calculated by the to-be-scheduled terminal based on a signal to interference plus noise ratio, a minimum signal to interference plus noise ratio corresponding to the to-be-scheduled terminal, and a base station side control value; or the fourth CCA detection threshold is calculated by the to-be-scheduled terminal based on a signal strength indicator value that is obtained through reference signal measurement, a noise power value, a minimum signal to interference plus noise ratio corresponding to the to-be-scheduled terminal, and a base station side control value.

In the data transmission method and apparatus provided in the embodiments of the present disclosure, the base station obtains the at least one CCA detection threshold, determines the current CCA detection threshold from the at least one CCA detection threshold, determines the transmit power of the to-be-sent data based on the current CCA detection threshold, and sends the to-be-sent data to the target terminal based on the transmit power. In this way, a CCA detection threshold is flexibly selected, the transmit power is adaptively adjusted, and a probability of space division multiplexing and spectrum usage efficiency are improved, thereby increasing a system capacity and avoiding interference between systems.

DESCRIPTION OF EMBODIMENTS

A base station, also referred to as a radio access network (RAN) device, is a device that connects a terminal to a wireless network, and may be a base transceiver station (BTS) in the Global System for Mobile Communications (GSM) or Code Division Multiple Access (CDMA), or may be a NodeB (NB) in Wideband Code Division Multiple Access (WCDMA), or may be an evolved NodeB (eNB or eNodeB), a relay station, or an access point in Long Term Evolution (LTE), or a base station in a future 5G network, or the like. This is not limited herein.

A terminal may be a wireless terminal or a wired terminal. The wireless terminal may be a device that provides a user with voice and/or other service data connectivity, a handheld device having a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) or a computer equipped with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile station, a remote station, a remote terminal, an access terminal, a user terminal, a user agent, or a user device. This is not limited herein.

In the embodiments of the present disclosure, "a plurality of" refers to two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

In addition, in a formula, "*" represents a multiplication sign, and "/" represents a division sign.

Figure 1:
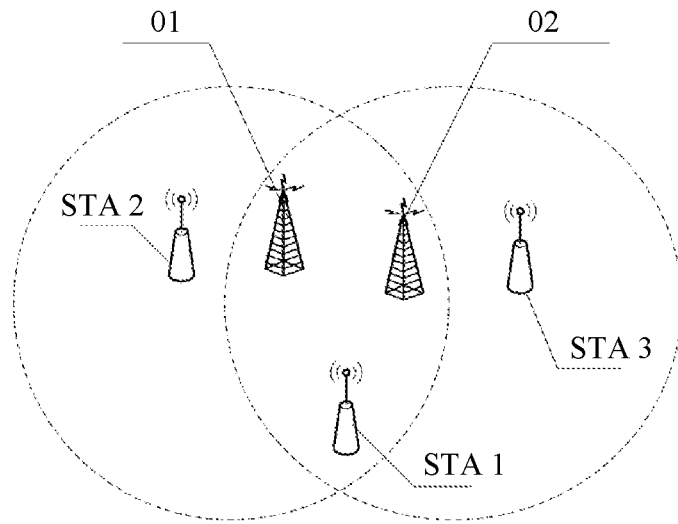
FIG. 1 is a schematic diagram of a system architecture of a data transmission method according to the present disclosure.

FIG. 1 is a schematic diagram of a system architecture of a data transmission method according to the present disclosure. As shown in FIG. 1, the system architecture includes a first access point 01 and a second access point 02, a left-side circle indicates a monitoring range of the first access point 01, and a right-side circle indicates a monitoring range of the second access point 02.

The first access point 01 includes two users: a remote-end user STA 1 and a near-end user STA 2. The second access point 02 includes one user: a STA 3.

In an existing method, when the first access point 01 sends data to the STA 1 or the STA 2, the second access point 02 considers, through listening, that a channel is busy, and stops sending data to the STA 3, but an actual situation is that the STA 2 is not in a range of the second access point, and sending data to the STA 2 by the first access point 01 does not interfere with sending data to the STA 3 by the second access point 02.

It should be noted that the system in this embodiment of the present disclosure may be a Long Term Evolution (LTE) communications system or an LTE-Advanced (LTE-A) communications system. This is not limited thereto.

In this embodiment of the present disclosure, to improve utilization of an unlicensed spectrum, a data transmission method is provided.

Certainly, this embodiment of the present disclosure is applicable to an unlicensed spectrum. This embodiment of the present disclosure is applicable to a carrier aggregation scenario, and is also applicable to a scenario of standalone use of an unlicensed spectrum. Carrier aggregation of an unlicensed spectrum may include: carrier aggregation of one or more carriers of the unlicensed spectrum, or carrier aggregation of one or more carriers of the unlicensed spectrum and one or more carriers included in a licensed spectrum. This is not limited herein.

Figure 2:
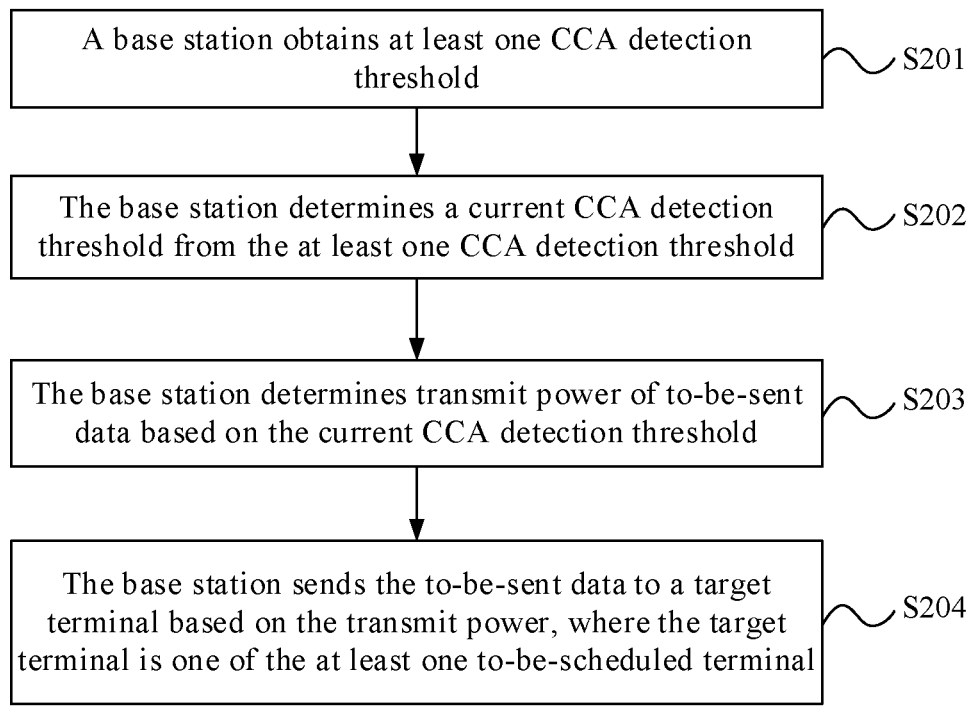
FIG. 2 is a schematic flowchart of a data transmission method according to an embodiment of the present disclosure.

FIG. 2 is a schematic flowchart of a data transmission method according to an embodiment of the present disclosure. As shown in FIG. 2, the method includes the following steps.

S201. A base station obtains at least one CCA detection threshold.

Each CCA detection threshold corresponds to at least one to-be-scheduled terminal.

In current data transmission, the base station may need to schedule one or more terminals, and may determine the at least one CCA detection threshold based on the terminal that needs to be scheduled.

It should be noted that the CCA detection threshold is an important parameter in an LBT mechanism, and is a basis used by the base station to determine whether a channel is busy. When signal energy detected by the base station is higher than the CCA detection threshold, the base station determines that the channel is currently in a busy state, that is, the channel is unavailable. When signal energy detected by the base station is lower than the CCA detection threshold, the base station determines that the channel is currently in an idle state, that is, the channel is available.

In this embodiment, for the at least one to-be-scheduled terminal that needs to be scheduled, the at least one CCA detection threshold is specifically set but a uniform CCA detection threshold is not used instead.

S202. The base station determines a current CCA detection threshold from the at least one CCA detection threshold.

S203. The base station determines transmit power of to-be-sent data based on the current CCA detection threshold.

Optionally, the transmit power is in a linear relationship with the current CCA detection threshold.

Specifically, in a preset range, the transmit power is in a linear relationship with a target CCA detection threshold. To be specific, the transmit power of the to-be-sent data is less than preset maximum transmit power and greater than preset minimum transmit power, and is in a linear relationship with the current CCA detection threshold.

S204. The base station sends the to-be-sent data to a target terminal based on the transmit power, where the target terminal belongs to the at least one to-be-scheduled terminal.

The transmit power of the to-be-sent data is determined based on the current CCA detection threshold, and the transmit power is in a linear relationship with the target CCA detection threshold, so that interference between systems can be avoided.

In this embodiment, the base station obtains the at least one CCA detection threshold, determines the current CCA detection threshold from the at least one CCA detection threshold, determines the transmit power of the to-be-sent data based on the current CCA detection threshold, and sends the to-be-sent data to the target terminal based on the transmit power. In this way, a CCA detection threshold is flexibly selected, the transmit power is adaptively adjusted, and a probability of space division multiplexing and spectrum usage efficiency are improved, thereby increasing a system capacity and avoiding interference between systems.

Optionally, the obtaining, by a base station, at least one CCA detection threshold may be: obtaining, by the base station, the at least one CCA detection threshold based on a modulation and coding scheme (MCS) of the at least one to-be-scheduled terminal.

Further, the obtaining, by the base station, the at least one CCA detection threshold based on an MCS of the at least one to-be-scheduled terminal may be: obtaining, by the base station, a first CCA detection threshold based on a preset first adjustment step, the MCS of the at least one to-be-scheduled terminal, a maximum MCS value in a system, and a CCA detection threshold corresponding to the system; and obtaining, by the base station, the at least one CCA detection threshold based on the first CCA detection threshold, and a minimum CCA detection threshold and a maximum CCA detection threshold that are allowed by the system.

An MCS of each to-be-scheduled terminal in the at least one to-be-scheduled terminal is an MCS value of the to-be-scheduled terminal after adjustment by the base station by using a CQI, or an average MCS value used for scheduling the to-be-scheduled terminal on an air interface in a preset statistical time period.

In this embodiment, a CCA detection threshold of each to-be-scheduled terminal is first determined based on an MCS of each to-be-scheduled terminal.

In other words, in an implementation, the base station may obtain the first CCA detection threshold based on the preset first adjustment step, the MCS value that is obtained after adjustment by the base station by using the channel quality indicator (CQI) and that is to be used to perform actual air-interface scheduling on the to-be-scheduled terminal, the maximum MCS value in the system, and the CCA detection threshold corresponding to the system. Then, the base station determines a CCA detection threshold of the to-be-scheduled terminal based on the first CCA detection threshold, and the minimum CCA detection threshold and the maximum CCA detection threshold that are allowed by the system.

The CCA detection threshold of the to-be-scheduled terminal is less than or equal to the maximum CCA detection threshold allowed by the system, and the CCA detection threshold of the to-be-scheduled terminal is greater than or equal to the minimum CCA detection threshold allowed by the system.

Optionally, a CCA detection threshold of a specific to-be-scheduled terminal is obtained by using the following formula: CCA detection threshold=min(max($CCATn1$, $CCAmin$), $CCAmax$).

$CCATn1$ is the first CCA detection threshold, and indicates a threshold, in a unit of decibel milliwatts (dBm), used for sending data to a to-be-scheduled terminal n.

Optionally, the first CCA detection threshold is: $CCATn1 = -82 + STEP1*MCSn/MCSmax$, where STEP indicates the preset first adjustment step, $MCSn$ indicates the MCS value after adjustment by the base station by using the CQI, $MCSmax$ indicates the maximum MCS value in the system, and a value of $MCSmax$ in an LTE system may be 28, but this is not limited thereto. "−82" indicates the CCA detection threshold, in a unit of dBm, corresponding to the system. The preset first adjustment step STEP1 may be controlled by a base station side, and a value range of the preset first adjustment step may be [20 dBm, 40 dBm]. This is not limited herein.

$CCAmin$ indicates the minimum CCA detection threshold allowed by the system, and $CCAmax$ indicates the maximum CCA detection threshold allowed by the system.

Alternatively, in another implementation, the base station obtains the first CCA detection threshold based on a preset first adjustment step, an average MCS value used for scheduling the to-be-scheduled terminal on an air interface in a preset statistical time period, a maximum MCS value in a system, and a CCA detection threshold corresponding to the system. Then, the base station determines a CCA detection threshold of the to-be-scheduled terminal based on the first CCA detection threshold, and a minimum CCA detection threshold and a maximum CCA detection threshold that are allowed by the system.

The CCA detection threshold of the to-be-scheduled terminal is less than or equal to the maximum CCA detection threshold allowed by the system, and the CCA detection threshold of the to-be-scheduled terminal is greater than or equal to the minimum CCA detection threshold allowed by the system.

Optionally, a quantity of times that a terminal is scheduled on the air interface in the preset statistical time period is counted, and an MCS value used each time the to-be-scheduled terminal is scheduled in the preset statistical time period is counted, to calculate an average value $MCSmean$.

It is assumed that a terminal A is scheduled five times in the preset statistical time period. MCS values corresponding to the terminal A for the five times are obtained, and an average value is finally obtained.

A specific calculation manner may be represented as follows: the first CCA detection threshold $CCATn1 = -82 + STEP1*MCSmean/MCSmax$, where $MCSmean$ indicates an average MCS value used for scheduling a terminal on the air interface in the preset statistical time period. The preset first adjustment step may be controlled by a base station side, and a value range of the preset first adjustment step may be [20 dBm, 40 dBm]. This is not limited herein.

Further, the CCA detection threshold may alternatively be obtained through calculation by using the following formula: CCA detection threshold=min(max($CCATn1$, $CCAmin$), $CCAmax$).

$CCAmin$ indicates the minimum CCA detection threshold allowed by the system, and $CCAmax$ indicates the maximum CCA detection threshold allowed by the system.

Further, the CCA detection threshold of the terminal may be determined in another manner.

Before the base station obtains the at least one CCA detection threshold, the base station may receive a received signal strength indicator (RSSI) reported by the at least one to-be-scheduled terminal, and the base station further determines a CCA detection threshold of each to-be-scheduled terminal based on the RSSI.

Optionally, the terminal obtains the RSSI based on a received signal, and then the to-be-scheduled terminal may report the RSSI to the base station by using physical layer signaling. The physical layer signaling may be Radio Resource Control (RRC) signaling, or Media Access Control control element (CE) signaling.

Further, the determining, by the base station, a CCA detection threshold of each to-be-scheduled terminal based on the RSSI may be: calculating, by the base station, a difference between the RSSI and a base station side control value, to obtain a second CCA detection threshold; and determining, by the base station, the CCA detection threshold of the terminal based on the second CCA detection threshold, and the minimum CCA detection threshold and the maximum CCA detection threshold that are allowed by the system. The CCA detection threshold of the to-be-scheduled terminal is less than or equal to the maximum CCA detection threshold allowed by the system, and the CCA detection threshold of the to-be-scheduled terminal is greater than or equal to the minimum CCA detection threshold allowed by the system.

Optionally, the second CCA detection threshold is: CCATn2=RSSI−Margin, where Margin represents the base station side control value, and a value range of Margin may be [0 dBm, 30 dBm].

$$CCA\ detection\ threshold=min(max(CCATn2, CCAmin), CCAmax).$$

CCAmin indicates the minimum CCA detection threshold allowed by the system, and CCAmax indicates the maximum CCA detection threshold allowed by the system.

Optionally, in another implementation, the obtaining, by a base station, at least one CCA detection threshold may be: receiving, by the base station, CQI information reported by the at least one to-be-scheduled terminal; and determining, by the base station, based on the CQI information, a CCA detection threshold of a to-be-scheduled terminal that reports the CQI information.

To be specific, the base station receives CQI information reported by different to-be-scheduled terminals, and determines a CCA detection threshold of a corresponding to-be-scheduled terminal based on the CQI information reported by the to-be-scheduled terminals. It should be noted that the CQI information reported by a terminal may be an instantaneous value, obtained by the terminal, for a specific moment, or may be an average value, calculated by the terminal, for a period of time.

The terminal may report the CQI information to the base station by using a physical uplink shared channel (PUSCH) or a physical uplink control channel (PUCCH). This is not limited thereto.

Specifically, the determining, by the base station based on the CQI information, a CCA detection threshold of a to-be-scheduled terminal that reports the CQI information may be: obtaining, by the base station, a third CCA detection threshold based on a preset second adjustment step, the CQI information, a maximum CQI value in a system, and a CCA detection threshold corresponding to the system; and determining, by the base station, based on the third CCA detection threshold, and a minimum CCA detection threshold and a maximum CCA detection threshold that are allowed by the system, the CCA detection threshold of the to-be-scheduled terminal that reports the CQI information. The CCA detection threshold of the to-be-scheduled terminal is less than or equal to the maximum CCA detection threshold allowed by the system, and the CCA detection threshold of the terminal is greater than or equal to the minimum CCA detection threshold allowed by the system.

Optionally, the third CCA detection threshold is represented by using the following formula: the third CCA detection threshold CCATn3=−82+STEP2*CQI/CQImax, where the preset second adjustment step STEP2 may be controlled by a base station side, and a value range of the preset second adjustment step may be [20 dBm, 40 dBm]. This is not limited herein. "−82" represents the CCA detection threshold, in a unit of dBm, corresponding to the system, but the CCA detection threshold corresponding to the system is not limited to this value. CQImax indicates an allowed maximum value of the CQI. The value is fixed as 15 in an LTE system, and is not limited herein.

Further, a CCA detection threshold=min(max(CCATn3, CCAmin), CCAmax).

CCAmin indicates the minimum CCA detection threshold allowed by the system, and CCAmax indicates the maximum CCA detection threshold allowed by the system.

Optionally, in another embodiment, the to-be-scheduled terminal may determine the CCA detection threshold of the to-be-scheduled terminal, and report the CCA detection threshold to the base station.

Specifically, before the base station obtains the at least one CCA detection threshold, the base station may further receive a CCA detection threshold or a CCA detection threshold level sent by the at least one to-be-scheduled terminal. The CCA detection threshold is determined by the to-be-scheduled terminal based on a fourth CCA detection threshold, and a minimum CCA detection threshold and a maximum CCA detection threshold that are allowed by a system, the CCA detection threshold is greater than or equal to the minimum CCA detection threshold allowed by the system, and the CCA detection threshold is less than or equal to the maximum CCA detection threshold allowed by the system.

Optionally, the terminal measures, based on an ambient environment, a highest CCA detection threshold that the terminal can accept, and then reports the highest CCA detection threshold to the base station.

Optionally, the fourth CCA detection threshold is calculated by the terminal based on a signal to interference plus noise ratio, a minimum signal to interference plus noise ratio corresponding to the terminal, and a base station side control value.

The fourth CCA detection threshold may be represented as follows: the fourth CCA detection threshold CCATn4=SINR−SINRmin−Margin, where SINR is the signal to interference plus noise ratio (SINR), SINRmin represents the minimum signal to interference plus noise ratio corresponding to the terminal, and Margin represents the base station side control value. A value range of Margin may be [0 dBm, 30 dBm], which is not limited herein.

Alternatively, the fourth CCA detection threshold is calculated by the terminal based on a signal strength indicator value that is obtained through reference signal measurement, a noise power value, a minimum signal to interference plus noise ratio corresponding to the terminal, and a base station side control value.

To be specific, the fourth CCA detection threshold is: CCATn4=RSSI−Noise−SINRmin−Margin, where RSSI represents the signal strength indicator value obtained by the terminal through reference signal measurement, Noise represents the noise power value, SINRmin represents the minimum signal to interference plus noise ratio corresponding to the terminal, and Margin represents the base station side control value. A value range of Margin may be [0 dBm, 30 dBm], which is not limited herein.

Further, a CCA detection threshold=min(max(CCATn4, CCAmin), CCAmax).

CCAmin indicates the minimum CCA detection threshold allowed by the system, and CCAmax indicates the maximum CCA detection threshold allowed by the system.

The base station may pre-store a mapping relationship between a CCA detection threshold level and a CCA detection threshold, or the terminal or another higher-layer device may send a mapping relationship between a CCA detection threshold level and a CCA detection threshold to the base station. If the base station receives the CCA detection threshold level sent by the terminal, the corresponding CCA detection threshold is determined based on the mapping relationship between a CCA detection threshold level and a CCA detection threshold.

Optionally, the to-be-scheduled terminal may send the CCA detection threshold level or the CCA detection threshold to the base station by using physical layer signaling.

The physical layer signaling may be RRC signaling or MAC CE signaling, and this is not limited herein.

Optionally, when sending data to the base station, the terminal may perform CCA detection in a manner similar to that used by the base station, that is, perform CCA detection by using a CCA detection threshold determined by the terminal, and after the detection succeeds, the terminal may also determine transmit power of uplink data based on the CCA detection threshold of the terminal, and send the uplink data to the base station by using the transmit power of the uplink data. The transmit power of the uplink data may also be in a linear relationship with the CCA detection threshold.

It should be noted that a radio channel is very complex and features randomness and time variance, and instantaneous values of the foregoing parameters such as RSSI, Noise, and SINR are not necessarily representative. Therefore, each of the parameters used in the foregoing formulas may be an average value that is obtained after a period of time of statistics collection, and this is not limited herein.

Optionally, in the foregoing embodiment, a value of CCAmin may be −92 dBm, and a value of CCAmax may be −62 dBm. This is not limited thereto.

Further, the foregoing process is mainly about how to determine a CCA detection threshold of a single terminal. After the determining is completed, at least one terminal that needs to be scheduled in current data transmission may be determined based on a specific scenario, and a CCA detection threshold corresponding to the at least one terminal may be determined.

Optionally, the at least one to-be-scheduled terminal that needs to be scheduled in the current data transmission may be at least one to-be-scheduled terminal that is scheduled in one burst, or at least one to-be-scheduled terminal that is scheduled in a first subframe of one burst.

It should be noted that, in some scenarios, the base station is allowed to use only one CCA detection threshold, for example, only one CCA detection threshold can be used according to some criteria or regulations, or according to environmental limitations. This is not limited herein.

When the base station uses one target CCA detection threshold in one data transmission, the determining, by the base station, a current CCA detection threshold from the at least one CCA detection threshold may include but is not limited to the following several cases:

(1) The base station schedules only one terminal in current data transmission. Therefore, the base station uses, as the current CCA detection threshold, a CCA detection threshold corresponding to the to-be-scheduled terminal that is to be scheduled in the data transmission.

In this case, if only one terminal is scheduled in the current data transmission, a CCA detection threshold of the terminal is used as the current CCA detection threshold.

(2) The base station performs CCA detection based on historical statistics or throughput prediction by using a first CCA detection threshold, and determines the first CCA detection threshold as the current CCA detection threshold after the CCA detection succeeds. The first CCA detection threshold is a CCA detection threshold corresponding to a first terminal, and the first terminal is one of the at least one to-be-scheduled terminal.

When the at least one to-be-scheduled terminal is two or more terminals, the base station may perform CCA detection by using a CCA detection threshold corresponding to one of the terminals, and uses, after the detection succeeds, the CCA detection threshold corresponding to the to-be-scheduled terminal as the current CCA detection threshold.

For example, the base station may obtain a historical CCA detection threshold with successful CCA detection from historical statistical data, and then select, from the at least one CCA detection threshold, a CCA detection threshold that is relatively close to the historical CCA detection threshold, to perform CCA detection; and/or the base station selects, from the at least one CCA detection threshold, a CCA detection threshold with a relatively desirable throughput prediction result, to perform CCA detection.

(3) The base station performs CCA detection by using a first CCA detection threshold, and determines the first CCA detection threshold as the current CCA detection threshold after the CCA detection succeeds. The first CCA detection threshold is a CCA detection threshold corresponding to a first terminal, and the first terminal is a terminal whose priority is the highest in the at least one to-be-scheduled terminal.

When the at least one to-be-scheduled terminal is two or more terminals, the base station may first determine a terminal whose priority is the highest in the to-be-scheduled terminals, and then determine a CCA detection threshold corresponding to the terminal whose priority is the highest, to perform CCA detection.

(4) The base station performs CCA detection by using a first CCA detection threshold, and determines the first CCA detection threshold as the current CCA detection threshold after the CCA detection succeeds. The first CCA detection threshold is a CCA detection threshold corresponding to a first terminal, the first terminal belongs to a first terminal group, and the CCA detection threshold corresponding to the first terminal is within a CCA detection threshold range of the first terminal group.

Terminals in each terminal group belong to a same CCA detection threshold range. In other words, the CCA detection threshold corresponding to the first terminal is less than or equal to the CCA detection threshold range of the first terminal group.

Terminals may be grouped based on ranges of CCA detection thresholds of the terminals. For example, terminals whose CCA detection thresholds belong to (−82 dBm, −72 dBm] are added to one group, and terminals whose CCA detection thresholds belong to (−72 dBm, −62 dBm] are added to another group. A fixed CCA detection threshold may be preset for each group. For example, a fixed CCA threshold for the group (−82 dBm, −72 dBm] is −77 dBm, and a fixed CCA threshold for the group (−72 dBm, −62 dBm] is −67 dBm. Based on terminal groups to which to-be-scheduled terminals belong, a fixed CCA detection threshold for one of the terminal groups is selected to perform CCA detection.

When the at least one to-be-scheduled terminal is two or more terminals and the to-be-scheduled terminals belong to a plurality of terminal groups, if scheduled terminals belong to a same terminal group, a fixed CCA detection threshold for the terminal group may be selected to perform CCA detection. If the to-be-scheduled terminals do not belong to a same terminal group, a terminal whose priority is the highest in the to-be-scheduled terminals may first be determined, and a fixed CCA detection threshold for a group to which the terminal whose priority is the highest belongs is used to perform CCA detection.

Further, in some scenarios, the base station may use a plurality of CCA detection thresholds. In this case, a plurality of CCA detection thresholds corresponding to a plurality of to-be-scheduled terminals may be directly used as a CCA detection threshold set, to perform CCA detection; or some CCA detection thresholds may be selected from the plurality of CCA detection thresholds as a CCA detection threshold set, to perform CCA detection.

Optionally, the determining, by the base station, a current CCA detection threshold from the at least one CCA detection threshold may be: determining, by the base station, a plurality of pending CCA detection thresholds from the at least one CCA detection threshold based on a priority of the at least one to-be-scheduled terminal, to perform CCA detection; and if the base station succeeds in performing detection by using a pending CCA detection threshold whose threshold is smallest in the plurality of pending CCA detection thresholds, determining, by the base station, the pending CCA detection threshold whose threshold is smallest as the current CCA detection threshold; or if the base station fails to perform detection by using a pending CCA detection threshold whose threshold is smallest, and the base station determines to wait for an N value corresponding to the pending CCA detection threshold whose threshold is smallest to decrease to zero, determining, by the base station, the pending CCA detection threshold whose threshold is smallest as the current CCA detection threshold. In other words, in this embodiment, the base station waits for the pending CCA detection threshold whose threshold is smallest to succeed in detection; or if the base station fails to perform detection by using a pending CCA detection threshold whose threshold is smallest, determining, by the base station, from the other pending CCA detection thresholds, a pending CCA detection threshold with successful CCA detection as the current CCA detection threshold. In other words, in this embodiment, the base station does not wait for the pending CCA detection threshold whose threshold is smallest to succeed in detection.

Optionally, the base station may predict a throughput based on historical statistical data, a decreasing speed of the N value in a CCA detection process of each pending CCA detection threshold, and the like. If the predicted throughput meets a preset condition, the base station may continue to wait for the pending CCA detection threshold whose threshold is smallest to perform CCA detection, till a corresponding N value is 0, and determines the pending CCA detection threshold whose threshold is smallest as a target CCA threshold after the pending CCA detection threshold whose threshold is smallest succeeds in detection. If the base station determines not to wait for the pending CCA detection threshold whose threshold is smallest to perform CCA detection, the base station may terminate other uncompleted CCA detection, and determine a pending CCA detection threshold with successful detection as the current CCA detection threshold, for example, select, as the current CCA detection threshold, a pending CCA detection threshold whose threshold is smallest from the pending CCA detection thresholds with successful detection, or select the current CCA detection threshold based on other data such as throughput prediction. This is not limited herein. The historical statistical data may be historical data of CCA detection thresholds with successful CCA detection.

In this embodiment, some CCA detection thresholds are selected based on a priority. For example, a preset quantity of CCA detection thresholds are selected in descending order of priorities of terminals, to perform CCA detection. This is not limited herein.

It should be noted that, when only one CCA detection threshold is used, the CCA detection threshold is directly used to perform CCA detection, and after the CCA detection succeeds, the transmit power is determined based on a preset linear relationship, and to-be-sent data is sent. When a plurality of CCA detection thresholds may be used, the plurality of CCA detection thresholds may be used to perform CCA detection simultaneously.

Figure 3:
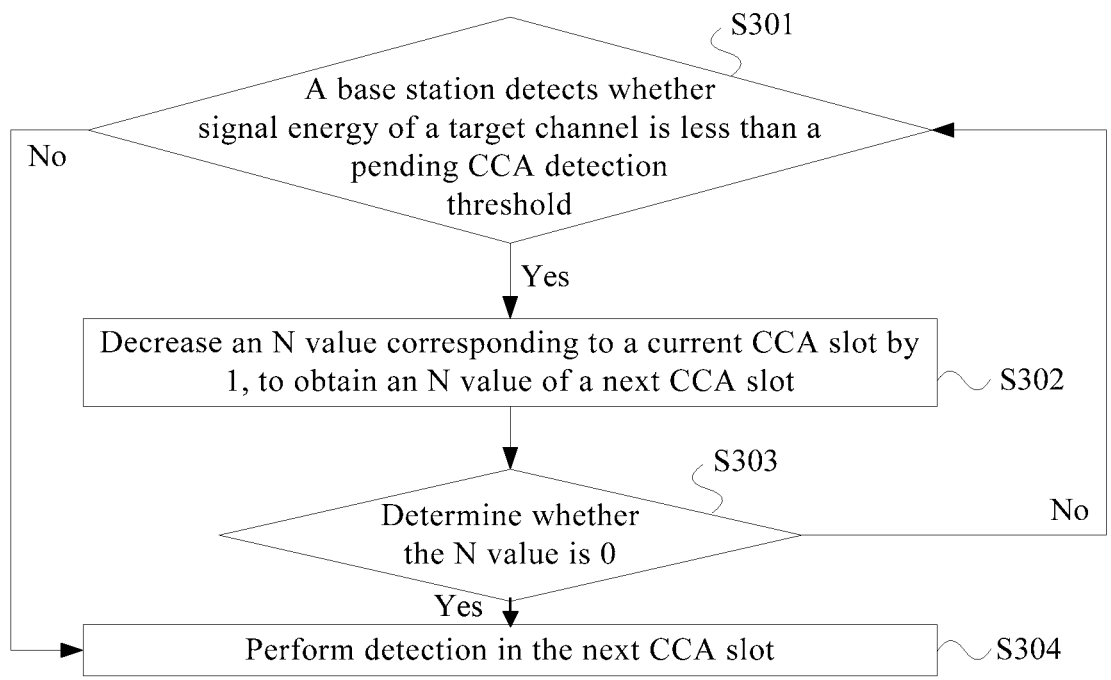
FIG. 3 is a schematic flowchart of another data transmission method according to an embodiment of the present disclosure.

FIG. 3 is a schematic flowchart of another data transmission method according to an embodiment of the present disclosure.

A plurality of pending CCA detection thresholds are determined from at least one CCA detection threshold, to perform CCA detection, and specifically, each pending CCA detection threshold may be used separately to perform the following method.

S301. A base station detects whether signal energy of a target channel is less than a pending CCA detection threshold.

When the signal energy of the target channel is less than the pending CCA detection threshold, S302 is performed; or when the signal energy of the target channel is greater than or equal to the pending CCA detection threshold, S304 is performed.

S302. Decrease an N value corresponding to a current CCA slot by 1, to obtain an N value of a next CCA slot.

S303. Determine whether the N value is 0; and if no, return to S301, or if yes, determine that CCA detection succeeds.

In this embodiment, the N value is a random number, and is one of basic parameters of an LBT technology in an LAA system. In each CCA slot, if the signal energy of the target channel is less than the pending CCA detection threshold, N is decreased by 1; otherwise, N remains unchanged, and the CCA detection continues in a next CCA slot until N is 0. When N is 0, it is considered that the CCA detection succeeds.

S304. Perform detection in the next CCA slot. In other words, it indicates that the detection fails, and S301 continues to be performed in the next CCA slot.

In the foregoing process, the CCA detection is performed at a granularity of a CCA slot, but is not limited thereto. Alternatively, the CCA detection may be performed by using another preset period.

CCA detection performed by using a plurality of CCA detection thresholds may be performed synchronously, or may not be performed synchronously but is independent of each other and does not affect each other.

Further, the determining a pending CCA detection threshold with successful CCA detection as the current CCA detection threshold may include the following manners:

Optionally, to quickly preempt a channel, the base station may directly determine a plurality of CCA detection thresholds instead of considering a terminal that is scheduled for current data transmission.

In an implementation, the base station determines the plurality of CCA detection thresholds within a preset range based on a preset interval. For example, in a range (−82 dBm, −62 dBm], values are selected every 5 dBm as the CCA detection thresholds. This is not limited herein.

After the plurality of CCA detection thresholds are determined, another process is the same as the foregoing embodiments, to further determine the current CCA detection threshold.

Such a manner in which the base station directly determines the plurality of CCA detection thresholds is applicable to network deployment for an indoor or hotspot area. Coverage intervals planned for these scenarios are usually relatively small, and terminals may be considered to basically be in positions with relatively good signal quality. Certainly, the two scenarios are not limited thereto.

Figure 4:
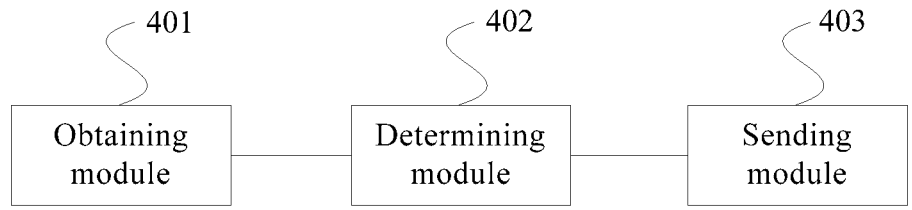
FIG. 4 is a schematic structural diagram of a data transmission apparatus according to an embodiment of the present disclosure.

FIG. 4 is a schematic structural diagram of a data transmission apparatus according to an embodiment of the present disclosure. As shown in FIG. 4, the apparatus includes an obtaining module 401, a determining module 402, and a sending module 403.

The obtaining module 401 is configured to obtain at least one clear channel assessment CCA detection threshold, where each CCA detection threshold corresponds to at least one to-be-scheduled terminal.

The determining module 402 is configured to: determine a current CCA detection threshold from the at least one CCA detection threshold, and determine transmit power of to-be-sent data based on the current CCA detection threshold.

The sending module 403 is configured to send the to-be-sent data to a target terminal based on the transmit power, where the target terminal belongs to the at least one to-be-scheduled terminal.

In this embodiment, a CCA detection threshold is flexibly selected, the transmit power is adaptively adjusted, and a probability of space division multiplexing and spectrum usage efficiency are improved, thereby increasing a system capacity and avoiding interference between systems.

Optionally, the determining module 402 is specifically configured to: perform CCA detection based on historical statistics or throughput prediction or both by using a first CCA detection threshold, and determine the first CCA detection threshold as the current CCA detection threshold after the CCA detection succeeds, where the first CCA detection threshold is a CCA detection threshold corresponding to a first terminal, and the first terminal is one of the at least one to-be-scheduled terminal; or
 perform CCA detection by using a first CCA detection threshold, and determine the first CCA detection threshold as the current CCA detection threshold after the CCA detection succeeds, where the first CCA detection threshold is a CCA detection threshold corresponding to a first terminal, and the first terminal is a terminal whose priority is the highest in the at least one to-be-scheduled terminal; or
 perform CCA detection by using a first CCA detection threshold, and determine the first CCA detection threshold as the current CCA detection threshold after the CCA detection succeeds, where the first CCA detection threshold is a CCA detection threshold corresponding to a first terminal, the first terminal belongs to a first terminal group, and the CCA detection threshold corresponding to the first terminal is within a CCA detection threshold range of the first terminal group.

Optionally, the determining module 402 is specifically configured to: determine a plurality of pending CCA detection thresholds from the at least one CCA detection threshold based on a priority of the at least one to-be-scheduled terminal, to perform CCA detection; and if detection performed by using a pending CCA detection threshold whose threshold is smallest in the plurality of pending CCA detection thresholds succeeds, determine the pending CCA detection threshold whose threshold is smallest as the current CCA detection threshold; or
 if detection performed by using a pending CCA detection threshold whose threshold is smallest fails, and it is determined to wait for an N value corresponding to the pending CCA detection threshold whose threshold is smallest to decrease to zero, determine the pending CCA detection threshold whose threshold is smallest as the current CCA detection threshold; or if detection performed by using a pending CCA detection threshold whose threshold is smallest fails, determine, from the other pending CCA detection thresholds, a pending CCA detection threshold with successful CCA detection as the current CCA detection threshold.

Optionally, the obtaining module 401 is specifically configured to obtain the at least one clear channel assessment CCA detection threshold based on a modulation and coding scheme MCS of the at least one to-be-scheduled terminal.

Optionally, the obtaining module 401 is specifically configured to: obtain the first CCA detection threshold based on a preset first adjustment step, the MCS of the at least one to-be-scheduled terminal, a maximum MCS value in a system, and a CCA detection threshold corresponding to the system; and obtain the at least one CCA detection threshold based on the first CCA detection threshold, and a minimum CCA detection threshold and a maximum CCA detection threshold that are allowed by the system; where an MCS of each to-be-scheduled terminal in the at least one to-be-scheduled terminal is an MCS value of the to-be-scheduled terminal after adjustment by the base station by using a channel quality indicator CQI, or an average MCS value used for scheduling the to-be-scheduled terminal on an air interface in a preset statistical time period.

Optionally, the obtaining module 401 is specifically configured to: receive a received signal strength indicator RSSI reported by the at least one to-be-scheduled terminal; and determine a CCA detection threshold of each to-be-scheduled terminal based on the RSSI.

Optionally, the obtaining module 401 is specifically configured to: calculate a difference between the RSSI and a base station side control value, to obtain a second CCA detection threshold; and determine, based on the second CCA detection threshold, and a minimum CCA detection threshold and a maximum CCA detection threshold that are allowed by a system, a CCA detection threshold of a to-be-scheduled terminal that reports the RSSI.

Optionally, the obtaining module 401 is specifically configured to: receive channel quality indicator CQI information reported by the at least one to-be-scheduled terminal, and determine, based on the CQI information, a CCA detection threshold of a to-be-scheduled terminal that reports the CQI information.

Optionally, the obtaining module 401 is specifically configured to: obtain a third CCA detection threshold based on a preset second adjustment step, the CQI information, a maximum CQI value in a system, and a CCA detection threshold corresponding to the system; and determine, based on the third CCA detection threshold, and a minimum CCA detection threshold and a maximum CCA detection threshold that are allowed by the system, a CCA detection threshold of a to-be-scheduled terminal that reports the CQI information.

Optionally, the obtaining module 401 is specifically configured to receive a CCA detection threshold or a CCA detection threshold level sent by the at least one to-be-scheduled terminal, where the CCA detection threshold is determined by the to-be-scheduled terminal based on a fourth CCA detection threshold, and a minimum CCA detection threshold and a maximum CCA detection threshold that are allowed by a system, and the fourth CCA detection threshold is calculated by the to-be-scheduled terminal based on a signal to interference plus noise ratio, a minimum signal to interference plus noise ratio corresponding to the to-be-scheduled terminal, and a base station side control value; or the fourth CCA detection threshold is calculated by the to-be-scheduled terminal based on a signal strength indicator value that is obtained through reference signal measurement, a noise power value, a minimum signal to interference plus noise ratio corresponding to the to-be-scheduled terminal, and a base station side control value.

An implementation principle and a technical effect of the apparatus are similar to those of the foregoing method embodiments, and details are not described herein again.

Figure 5:
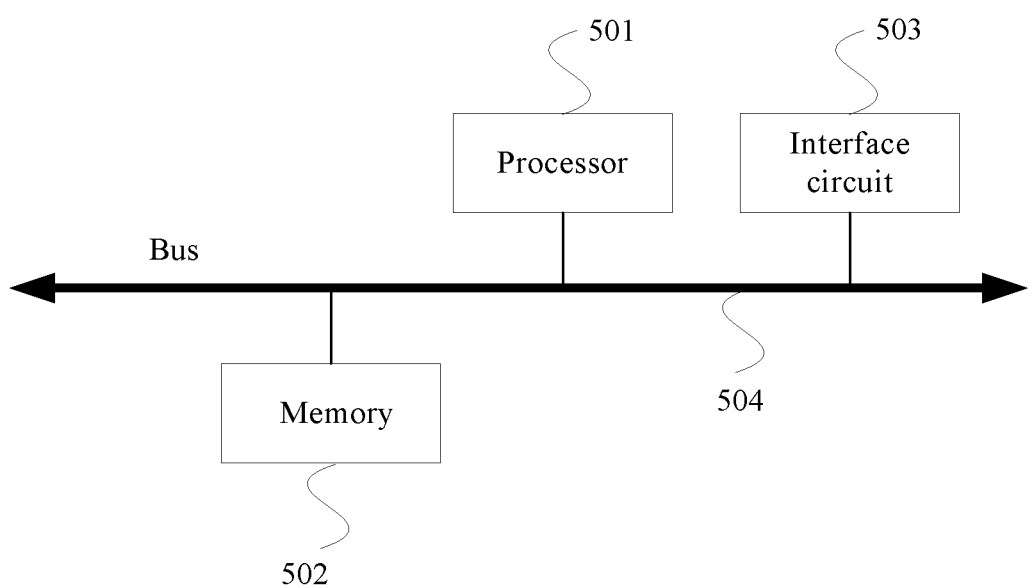
FIG. 5 is a schematic structural diagram of another data transmission apparatus according to an embodiment of the present disclosure.

FIG. 5 is a schematic structural diagram of another data transmission apparatus according to an embodiment of the present disclosure. As shown in FIG. 5, the apparatus includes: a processor 501, a memory 502, an interface circuit 503, and a bus 504.

The processor 501, the memory 502, and the interface circuit 503 are connected to and communicate with each other by using the bus 504. The processor 501 interacts with another apparatus by using the interface circuit 503. The memory 502 stores a set of program code, and the processor 501 invokes the program code stored in the memory, to perform the following operations:

obtaining at least one clear channel assessment CCA detection threshold, where each CCA detection threshold corresponds to at least one to-be-scheduled terminal;

determining a current CCA detection threshold from the at least one CCA detection threshold;

determining transmit power of to-be-sent data based on the current CCA detection threshold; and sending the to-be-sent data to a target terminal based on the transmit power, where the target terminal belongs to the at least one to-be-scheduled terminal.

Optionally, the processor 501 is specifically configured to: perform CCA detection based on historical statistics or throughput prediction or both by using a first CCA detection threshold, and determine the first CCA detection threshold as the current CCA detection threshold after the CCA detection succeeds, where the first CCA detection threshold is a CCA detection threshold corresponding to a first terminal, and the first terminal is one of the at least one to-be-scheduled terminal; or perform CCA detection by using a first CCA detection threshold, and determine the first CCA detection threshold as the current CCA detection threshold after the CCA detection succeeds, where the first CCA detection threshold is a CCA detection threshold corresponding to a first terminal, and the first terminal is a terminal whose priority is the highest in the at least one to-be-scheduled terminal; or perform CCA detection by using a first CCA detection threshold, and determine the first CCA detection threshold as the current CCA detection threshold after the CCA detection succeeds, where the first CCA detection threshold is a CCA detection threshold corresponding to a first terminal, the first terminal belongs to a first terminal group, and the CCA detection threshold corresponding to the first terminal is within a CCA detection threshold range of the first terminal group.

Optionally, the processor 501 is specifically configured to: determine a plurality of pending CCA detection thresholds from the at least one CCA detection threshold based on a priority of the at least one to-be-scheduled terminal, to perform CCA detection; and if detection performed by using a pending CCA detection threshold whose threshold is smallest in the plurality of pending CCA detection thresholds succeeds, determine the pending CCA detection threshold whose threshold is smallest as the current CCA detection threshold; or if detection performed by using a pending CCA detection threshold whose threshold is smallest fails, and it is determined to wait for an N value corresponding to the pending CCA detection threshold whose threshold is smallest to decrease to zero, determine the pending CCA detection threshold whose threshold is smallest as the current CCA detection threshold; or if detection performed by using a pending CCA detection threshold whose threshold is smallest fails, determine, from the other pending CCA detection thresholds, a pending CCA detection threshold with successful CCA detection as the current CCA detection threshold.

Optionally, the processor 501 is specifically configured to obtain the at least one clear channel assessment CCA detection threshold based on a modulation and coding scheme MCS of the at least one to-be-scheduled terminal.

Optionally, the processor 501 is specifically configured to: obtain the first CCA detection threshold based on a preset first adjustment step, the MCS of the at least one to-be-scheduled terminal, a maximum MCS value in a system, and a CCA detection threshold corresponding to the system; and obtain the at least one CCA detection threshold based on the first CCA detection threshold, and a minimum CCA detection threshold and a maximum CCA detection threshold that are allowed by the system; where an MCS of each to-be-scheduled terminal in the at least one to-be-scheduled terminal is an MCS value of the to-be-scheduled terminal after adjustment by the base station by using a channel quality indicator CQI, or an average MCS value used for scheduling the to-be-scheduled terminal on an air interface in a preset statistical time period.

Optionally, the processor 501 is specifically configured to: receive a received signal strength indicator RSSI reported by the at least one to-be-scheduled terminal, and determine a CCA detection threshold of each to-be-scheduled terminal based on the RSSI.

Optionally, the processor 501 is specifically configured to: calculate a difference between the RSSI and a base station side control value, to obtain a second CCA detection threshold; and determine, based on the second CCA detection threshold, and a minimum CCA detection threshold and a maximum CCA detection threshold that are allowed by a system, a CCA detection threshold of a to-be-scheduled terminal that reports the RSSI.

Optionally, the processor 501 is specifically configured to: receive channel quality indicator CQI information reported by the at least one to-be-scheduled terminal, and determine, based on the CQI information, a CCA detection threshold of a to-be-scheduled terminal that reports the CQI information.

Optionally, the processor 501 is specifically configured to: obtain a third CCA detection threshold based on a preset second adjustment step, the CQI information, a maximum CQI value in a system, and a CCA detection threshold corresponding to the system; and determine, based on the third CCA detection threshold, and a minimum CCA detection threshold and a maximum CCA detection threshold that are allowed by the system, a CCA detection threshold of a to-be-scheduled terminal that reports the CQI information.

Optionally, the processor 501 is specifically configured to receive a CCA detection threshold or a CCA detection threshold level sent by the at least one to-be-scheduled terminal, where the CCA detection threshold is determined by the to-be-scheduled terminal based on a fourth CCA detection threshold, and a minimum CCA detection threshold and a maximum CCA detection threshold that are allowed by a system, and the fourth CCA detection threshold is calculated by the to-be-scheduled terminal based on a signal to interference plus noise ratio, a minimum signal to interference plus noise ratio corresponding to the to-be-scheduled terminal, and a base station side control value; or the fourth CCA detection threshold is calculated by the to-be-scheduled terminal based on a signal strength indicator value that is obtained through reference signal measurement, a noise power value, a minimum signal to interference plus noise ratio corresponding to the to-be-scheduled terminal, and a base station side control value.

An implementation principle and a technical effect of the apparatus are similar to those of the foregoing method embodiments, and details are not described herein again.

In the several embodiments provided in the present disclosure, it should be understood that the disclosed apparatus and method may be implemented in other manners. For example, the described apparatus embodiment is merely an example. For example, the unit division is merely logical function division and there may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware combined with a software functional unit.

When the foregoing integrated unit is implemented in a form of a software functional unit, the integrated unit may be stored in a computer-readable storage medium. The software functional unit is stored in a storage medium, and includes several instructions for instructing a computer device (which may be a personal computer, a server, a network device, or the like) or a processor to perform some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A data transmission method, comprising:
   obtaining, by a base station, a plurality of clear channel assessment (CCA) detection thresholds corresponding to a plurality of to-be-scheduled terminals in current data transmission, wherein each CCA detection threshold in the plurality of CCA detection thresholds is different and corresponds to one terminal of the plurality of to-be-scheduled terminals, and wherein the CCA detection threshold for a given to-be-scheduled terminal of the plurality of to-be-scheduled terminals is calculated by the base station based on a received signal strength indicator (RSSI) reported by the given to-be-scheduled terminal to the base station;
   determining, by the base station, a current CCA detection threshold from the plurality of CCA detection thresholds;
   determining, by the base station, transmit power of to-be-sent data based on the current CCA detection threshold; and
   sending, by the base station, the to-be-sent data to a target terminal of the plurality of to-be-scheduled terminals based on the transmit power;
   wherein the determining, by the base station, the current CCA detection threshold from the plurality of CCA detection thresholds comprises:
   performing, by the base station, CCA detection using a first CCA detection threshold from the plurality of CCA detection thresholds, and determining the first CCA detection threshold as the current CCA detection threshold after performing the CCA detection succeeds, wherein the first CCA detection threshold is a CCA detection threshold corresponding to a first terminal of the plurality of to-be-scheduled terminals,
   wherein the first terminal belongs to a first terminal group, and the first CCA detection threshold is a fixed CCA detection threshold for the first terminal group, the fixed CCA detection threshold is within a CCA detection threshold range of the first terminal group;
   wherein the obtaining, by the base station, the plurality of CCA detection thresholds according to the plurality of to-be-scheduled terminals comprises:
   obtaining, by the base station, the plurality of CCA detection thresholds based on a modulation and coding scheme (MCS) of the plurality of to-be-scheduled terminals,
   obtaining, by the base station, the first CCA detection threshold based on a preset first adjustment step, the MCS of the plurality of to-be-scheduled terminals, a maximum MCS value in a communication system, and a CCA detection threshold predefined in the communication system, and obtaining, by the base station, the plurality of CCA detection thresholds based on the first CCA detection threshold, a minimum CCA detection threshold, and a maximum CCA detection threshold, wherein the minimum CCA detection threshold and the maximum CCA detection threshold are allowed by the communication system; and wherein an MCS of each to-be-scheduled terminal in the plurality of to-be-scheduled terminals is an MCS value of the to-be-scheduled terminal after adjustment by the base station using a channel quality indicator (CQI), or an average MCS value used for scheduling the to-be-scheduled terminal on an air interface in a preset statistical time period.

2. A data transmission apparatus, comprising:
a memory configured to store program instructions; and
a processor configured to invoke the program instructions in the memory to perform the following method:

obtaining a plurality of clear channel assessment (CCA) detection thresholds corresponding to a plurality of to-be-scheduled terminals in current data transmission, wherein each CCA detection threshold in the plurality of CCA detection thresholds is different and corresponds to one terminal of the plurality of to-be-scheduled terminals, and wherein the CCA detection threshold for a given to-be-scheduled terminal of the plurality of to-be-scheduled terminals is calculated by the apparatus based on a received signal strength indicator (RSSI) reported by the given to-be-scheduled terminal to the apparatus;

determining a current CCA detection threshold from the plurality of CCA detection thresholds;

determining transmit power of to-be-sent data based on the current CCA detection threshold; and sending the to-be-sent data to a target terminal of the plurality of to-be-scheduled terminals based on the transmit power;

wherein the determining the current CCA detection threshold from the plurality of CCA detection thresholds comprises:

performing CCA detection using a first CCA detection threshold from the plurality of CCA detection thresholds, and determining the first CCA detection threshold as the current CCA detection threshold after performing the CCA detection succeeds, wherein the first CCA detection threshold is a CCA detection threshold corresponding to a first terminal of the plurality of to-be-scheduled terminals, wherein the first terminal belongs to a first terminal group, and the first CCA detection threshold is a fixed CCA detection threshold for the first terminal group, the fixed CCA detection threshold is within a CCA detection threshold range of the first terminal group;

wherein the obtaining the plurality of CCA detection thresholds according to the plurality of to-be-scheduled terminals comprises:

obtaining the plurality of CCA detection thresholds based on a modulation and coding scheme (MCS) of the plurality of to-be-scheduled terminals, obtaining the first CCA detection threshold based on a preset first adjustment step, the MCS of the plurality of to-be-scheduled terminals, a maximum MCS value in a communication system, and a CCA detection threshold predefined in the communication system, and obtaining the plurality of CCA detection thresholds based on the first CCA detection threshold, a minimum CCA detection threshold, and a maximum CCA detection threshold, wherein the minimum CCA detection threshold and the maximum CCA detection threshold are allowed by the communication system; and wherein an MCS of each to-be-scheduled terminal in the plurality of to-be-scheduled terminals is an MCS value of the to-be-scheduled terminal after adjustment by the apparatus using a channel quality indicator (CQI), or an average MCS value used for scheduling the to-be-scheduled terminal on an air interface in a preset statistical time period.

* * * * *